(12) United States Patent
Eilemann et al.

(10) Patent No.: US 10,138,798 B2
(45) Date of Patent: Nov. 27, 2018

(54) HEAT ACCUMULATOR

(71) Applicant: MAHLE International GmbH, Stuttgart (DE)

(72) Inventors: Andreas Eilemann, Erdmannhausen (DE); Spasoje Ignjatovic, Illingen (DE); Ruediger Koelblin, Esslingen (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 14/278,858

(22) Filed: May 15, 2014

(65) Prior Publication Data

US 2014/0331946 A1 Nov. 13, 2014

Related U.S. Application Data

(63) Continuation of application No. PCT/EP2011/070408, filed on Nov. 17, 2011.

(51) Int. Cl.
*F01P 11/02* (2006.01)
*F02D 31/00* (2006.01)
(Continued)

(52) U.S. Cl.
CPC .............. *F01P 11/08* (2013.01); *F01M 5/021* (2013.01); *F28D 20/02* (2013.01);
(Continued)

(58) Field of Classification Search
CPC ...... F01P 11/20; F01P 2011/205; F01P 11/08; F02N 19/10; F02M 59/447; F02B 3/06;
(Continued)

(56) References Cited

U.S. PATENT DOCUMENTS 1,788,605 A 1/1931 Walters
4,038,152 A * 7/1977 Atkins ...................... C10B 7/06
196/98

(Continued)

FOREIGN PATENT DOCUMENTS

CN 1332319 A 1/2002
CN 2881507 Y 3/2007
(Continued)

OTHER PUBLICATIONS

First Chinese Office Action for Chinese Application No. 201180074889.2 dated Aug. 7, 2015 with English translation.
(Continued)

*Primary Examiner* — Syed O Hasan
(74) *Attorney, Agent, or Firm* — Muncy, Geissler, Olds & Lowe, P.C.

(57) ABSTRACT

A heat accumulator for use in a motor vehicle having a heat accumulator container which can be integrated into the motor oil circuit, through which motor oil flows when the motor is running, and which is disconnected from the circuit when the motor is switched off. The oil pan of the motor, in particular the lower part of the oil pan, is provided as the heat accumulator container, and the oil pan is provided with heat-insulating container walls. Also, an element for increasing the heat capacity of the heat accumulator is provided.

15 Claims, 6 Drawing Sheets

(51) Int. Cl.
    *F01P 11/08*     (2006.01)
    *F01M 5/02*     (2006.01)
    *F28D 20/02*     (2006.01)
    *F01M 11/00*     (2006.01)
    *F01P 11/20*     (2006.01)

(52) U.S. Cl.
    CPC ............... *F01M 2005/023* (2013.01); *F01M 2011/0016* (2013.01); *F01P 2011/205* (2013.01); *F28F 2270/00* (2013.01); *Y02E 60/145* (2013.01)

(58) Field of Classification Search
    CPC ............ F01M 5/021; F01M 2005/023; F01M 2011/0016; F28D 20/02
    USPC ............................ 123/41.14, 366, 685, 27 A
    See application file for complete search history.

(56) References Cited

U.S. PATENT DOCUMENTS

| | | | | |
|---|---|---|---|---|
| 4,134,380 | A * | 1/1979 | Niwa | ............... F01M 5/005 123/142.5 E |
| 6,629,512 | B2 | 10/2003 | Iwatani et al. | |
| 6,640,767 | B2 * | 11/2003 | Kato | ...................... F01M 5/02 123/195 C |
| 7,509,935 | B2 * | 3/2009 | Vincer | ............... F01M 11/0004 123/195 C |
| 7,654,241 | B2 * | 2/2010 | Kobayashi | ............. F01M 5/001 123/195 C |
| 7,946,388 | B2 * | 5/2011 | Kobayashi | ............... F01M 5/02 184/1.5 |
| 8,978,515 | B2 | 3/2015 | Riedel et al. | |
| 2009/0039089 | A1 | 2/2009 | Tsukahara et al. | |
| 2009/0236435 | A1 * | 9/2009 | Kudo | ..................... F01P 11/20 237/12.3 B |
| 2009/0288617 | A1 * | 11/2009 | Hiyama | .................. B60H 1/14 123/41.14 |

FOREIGN PATENT DOCUMENTS

| | | | |
|---|---|---|---|
| CN | 201149453 | Y | 11/2008 |
| CN | 102207187 | A | 10/2011 |
| DE | 30 32 090 | A1 | 4/1982 |
| DE | 10 2005 052632 | | 5/2007 |
| DE | 10 2007 045 164 | A1 | 4/2009 |
| DE | 10 2008 059 619 | A1 | 2/2010 |
| DE | 102005052632 | * | 5/2010 |
| EP | 0391535 | * | 10/1990 |
| JP | H 04-059313 | U | 5/1992 |
| JP | H 04-059314 | U | 5/1992 |
| JP | H06 30674 | U | 4/1994 |
| JP | H0630674 | * | 6/1994 |
| JP | 10 008955 | A | 1/1998 |
| JP | 10008955 | * | 1/1998 |
| JP | 2000-199416 | A | 7/2000 |
| JP | 2002-188422 | A | 7/2002 |
| JP | 2004075188 | A | 3/2004 |
| JP | 2004-317044 | A | 11/2004 |
| JP | 2006 183943 | A | 7/2006 |
| JP | 2009-228428 | A | 10/2009 |

OTHER PUBLICATIONS

Japanese Office Action for Japanese Application No. 2014-541545 dated Apr. 14, 2015 with partial English translation.

Chinese Office Action for Chinese Appilcation No. 201180074889.2 dated Feb. 29, 2016 with English translation.

Japanese Final Office Action for Japanese Application No. 2014-541545 dated Feb. 2, 2016 with partial English translation.

Notice of Final Rejection dated Aug. 22, 2018 of Korean Patent Office in corresponding application 10-2014-7016573.

\* cited by examiner

HEAT ACCUMULATOR

This nonprovisional application is a continuation of International Application No. PCT/EP2011/070408, which was filed on Nov. 17, 2011, and which is herein incorporated by reference.

BACKGROUND OF THE INVENTION

Field of the Invention

The present invention relates to a heat accumulator and a heat accumulator.

Description of the Background Art

A variety of heat accumulators, particularly for use in a motor vehicle, are known from the conventional art.

A conventional heat accumulator type, which is also designed and realized for the use in motor vehicles, is, for example, the latent heat accumulator, having an inner tank, the storage core in which a heat storage medium, e.g., a storage salt, is located, and an outer tank with a thermal insulation provided between these. For example, the conventional heat accumulator types are provided for thermal insulation of the motor oil or of the cooling water. It is disadvantageous in the case of the conventional heat accumulators, however, that because of the selection of the material (mostly stainless steel), the heat accumulators are associated with great construction effort with simultaneously increased production costs, and costly operational processes are necessary because of their technical design.

Regarding their structural and technical design, such heat accumulators thus leave something to be desired.

SUMMARY OF THE INVENTION

It is therefore an object of the present invention to provide an improved heat accumulator.

In an embodiment, a heat accumulator, particularly for use in a motor vehicle, is provided with a heat storage tank, which can be integrated into the motor oil circuit, through which the motor oil flows when the engine is running, and which is decoupled from the circuit when the engine is turned off, whereby the engine oil pan, particularly in its lower section, is provided as the heat storage tank and is provided with heat-insulating tank walls, and in particular an element for increasing the heat capacity of the heat accumulator is provided.

A part or area of the oil pan thus can function as a heat accumulator, whereby the hot oil can be stored in the heat accumulator when the engine is turned off. If the engine is started up again or the vehicle is opened, the hot stored motor oil can be pumped or conveyed back to the engine. The hot motor oil in the heat storage tank can be closed off via at least one valve or the like. A more rapid heating of the interior by the more rapid heating of the motor oil and lower fuel consumption in the cold-running phase (less friction in the engine due to the warm motor oil) can be realized with the help of the heat storage tank. The oil pan is formed here substantially as a single piece and contains the heat storage tank in a lower section. By increasing the heat capacity by means of the element for increasing the heat capacity, this effect can be increased further, because reheating of the fluid present in the heat accumulator occurs during the exchange thereby.

An embodiment provides that an oil-filled gearbox, particularly an automatic gearbox, can be provided, whereby the gearbox is co-utilized as a heat storage tank and is designed accordingly. In particular, the oil pan and the gearbox are divided into two separate layers. If the engine is turned off, the valves close the insulated area of the oil pan, so that the oil supplied to the insulated area of the oil pan cannot cool further or cool only slightly. Here as well, the storage of the hot transmission oil can produce a rapid and gentle heating of the engine in the cold-running phase and more rapid peak load limits of the individual transmission components.

A further embodiment provides a heat accumulator, particularly for use in a motor vehicle, with a heat storage tank, which can be integrated into the motor oil circuit, traversed by the motor oil when the engine is running, and which is decoupled from the circuit when the engine is turned off, whereby the heat storage tank can be formed as a separate heat-insulated additional tank, and whereby the additional tank is disposed in the area of the oil pan or on said pan and is connected to said pan by suitable means, to enable an inflow of hot oil from the oil pan into the additional tank or from the additional tank into the oil pan, and whereby particularly an element for increasing the heat capacity of the heat accumulator is provided.

It would be conceivable, for example, to connect the additional tank directly to a section of the oil pan in order to save installation space.

A further embodiment provides a heat accumulator, particularly for use in a motor vehicle, with a heat storage tank that can be integrated into the motor oil circuit, through which flow occurs when the engine is running, and which is decoupled from the circuit when the engine is turned off, whereby an additional tank with an inlet opening and an outlet opening is provided as a heat storage tank and is provided with heat-insulating tank walls, and whereby particularly an element for increasing the heat capacity of the heat accumulator is provided.

The heat storage tank enables a more rapid heating of the interior by the more rapid heating of the engine. In particular, the engine generates heat which is stored in the cooling water and is released via the radiator. This heat is to be stored, so that the engine, having been turned off for a longer period, can be brought to operating temperature as rapidly as possible after a restart.

The cooling fluid is reheated during the exchange by the increased heat capacity. The heat accumulator delivers hot cooling fluid to the engine, and cold cooling fluid flows into the heat accumulator and is reheated there to a higher temperature by the hot heat accumulator. As a result, the cooling fluid circuit is supplied not only with cold cooling fluid, but with a prewarmed cooling fluid; this does not stress the coolant temperature as much during operation than if the cooling fluid would not have been prewarmed.

In a further embodiment, the heat storage tank can also be used as an expansion tank of the engine-cooling fluid circuit. This preferred embodiment saves weight, so that subsequently fuel consumption of the motor vehicle can be reduced.

For example, the heat storage tank has heat-insulating tank walls of particularly cylindrical, inner or outer tanks, relative to one another, each with an intermediate thermal insulation layer. For example, two cylindrical closed tanks made of plastic or some other suitable materials are provided, whereby one tank may be larger and one tank smaller such that the larger tank is suitable for receiving the smaller tank, whereby a heat-insulating intermediate layer is provided between the outer tank wall of the small tank and the inner tank wall of the larger tank (thermos flask principle). In the described embodiment, a smaller tank is located in the larger tank. To improve the thermal insulation, the space between these is evacuated. The heat loss due to reflection of the heat radiation can be reduced further, for example, by a coating or mirror coating of the side facing the storage medium. The heat equalization between the inside and outside, which can occur by heat conduction, heat radiation, and by convection, is reduced by this design.

For example, it can be provided that the particular heat storage medium flows through the inner tank when the engine is running and when it is turned off the inner tank can be decoupled in terms of a thermally insulated, storable heat reservoir. For example, the inner tank can have two or more connecting pieces or the like connected to the coolant circuit and can be directed outward through suitable openings in the outer tank. The connections themselves can be insulated as well from the inside in order to reduce heat losses. Further, for the purpose of separation or closing off, valves, particularly check valves, or floats or the like can be provided, resulting in a completely insulated and thermally closed system by means of the heat accumulator.

An embodiment provides that a thermal insulation layer can be provided in the form of a plastic insulation layer. A further preferred embodiment provides that a thermal insulation layer can be provided in the form of an air insulation layer. For example, foam, Styropor, silica, or, for example, vacuum plates can be used as the insulation layer as well. For example, a panel-like structure of a heat storage tank can be provided, such that the heat storage tank has a plurality of individual insulation panels through which or around which flow occurs (vacuum panels).

An embodiment provides that both the inner and outer tanks are made of plastic. Further, it is not imperative in this embodiment but preferable to form the thermal insulation layer between the two tanks as an evacuated heat-insulating body. Such heat-insulating bodies have, for example, a core of compressed silica powder, which is wrapped in or packed vacuum-tight into a high-barrier film. The form of this heat-insulating body is preferably plate-shaped, but can assume almost any desired form depending on the application. By using such evacuated heat-insulating bodies, in particular the evacuation of the space between the inner and outer tank can be omitted. Thus, a cost-effective heat accumulator can be provided overall.

In a further embodiment, it is provided that the inlet opening is formed as an inlet connecting piece and the outlet opening as an outlet connecting piece, whereby preferably the inlet connecting piece and/or the outlet connecting piece are disposed at least partially between the inner and outer tank.

In a further embodiment, the heat accumulator comprises a plurality of chambers, which are each connected communicating with one another via at least one opening. Thus, it is possible to selectively influence the discharge behavior by the size of the opening.

It is advantageous further for the element for increasing the heat capacity to be an element connected to the inner tank or formed integrally with the tank. A good thermal connection can be realized thereby leading to rapid charging or discharging, allowing for rapid heating, for example, of the cooling fluid which flows into the heated heat accumulator.

It is furthermore expedient for the element to be a plastic or metal element, which has or produces an increased wall thickness.

It is also expedient, if the element strengthens the wall of the inner tank at least in sections or overall, or if the wall particularly of the inner tank, possibly also the outer tank, is provided with an increased wall thickness. An effective utilization can be achieved by an at least substantially overall increase in the heat capacity of the heat accumulator by the wall of the heat accumulator itself, because the direct heat transfer can occur from the wall to the fluid.

A heat accumulator of the invention is suitable not only for storing thermal energy of internal combustion engines. It is also suitable for use in vehicles with an electric drive or with a hybrid drive. In this regard, it can also be used, for example, in a fluid circuit for controlling the temperature of the battery in the vehicle. This is especially advantageous because the temperature control of a battery is thereby accelerated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
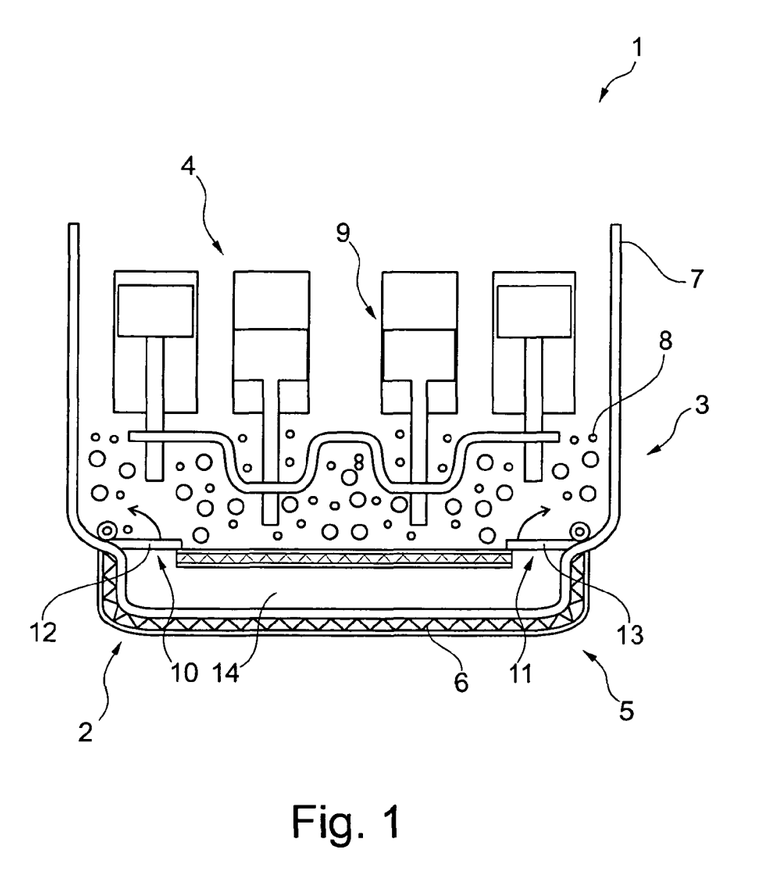
FIG. 1 is a schematic illustration of a first heat accumulator of the invention.

FIG. 1 shows a heat accumulator 1 for use in a motor vehicle, whereby oil pan 3 of engine 4, particularly in its lower section 5, is provided as heat storage tank 2 and is provided with heat-insulating tank walls 6.

Heat storage tank 2 is produced integrally with engine housing 7. An amount of oil 8 is present in engine housing 7.

Oil 8 is located within engine housing 7 and surrounds drive elements 9 disposed within engine housing 7. Engine 4 in the schematic illustration shown here is in a position for use or in actual operation.

If the engine is turned off, oil 8 present in engine housing 7 can flow into heat storage tank 2 via inlet openings 10 and 11, which are closed and opened by means of two valves 12, 13, and there is kept warm due to the heat-insulating properties of the tank. If the motor vehicle is restarted or the doors are opened, warm oil 8 can be pumped back into engine housing 7 using a mechanism that is not shown, particularly a pump.

In particular, inner region 14 of heat storage tank 2 is thus heat-insulated. Flow through said inner region 14 can be continuous (in the case of opened valves 12, 13) and the region can be closed only when engine 4 is turned off or it can function as an extra store, which is opened only when engine 4 is turned off. A selective increase in heat capacity can be achieved by the specific design of the inner wall of the tank, said wall which comes into contact with the oil. This can occur by the selection of the material, wall thickness, or by the provision of an additional component.

Figure 2:
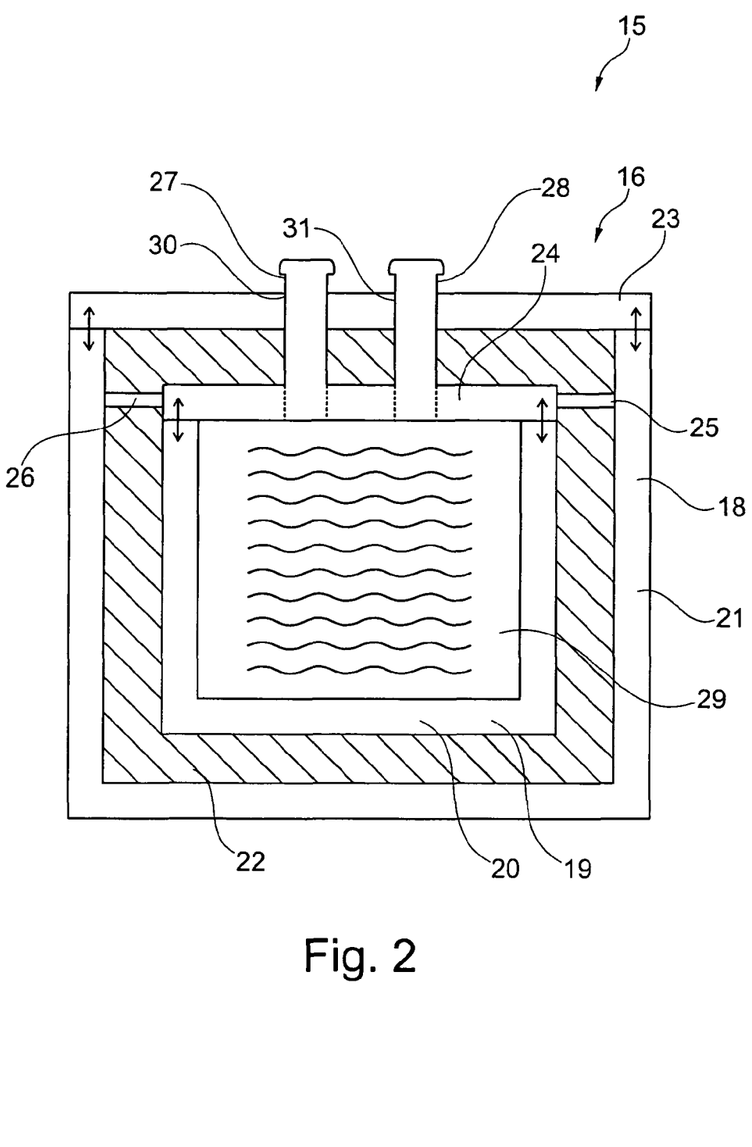
FIG. 2 is a schematic illustration of a second heat accumulator of the invention.

FIG. 2 shows a heat accumulator 15 for use in a motor vehicle, with a heat storage tank 16, which can be integrated into the engine-cooling fluid circuit, whereby as heat storage tank 16 an additional tank is provided, which with heat-insulating tank walls 18, 19 is formed of particularly cylindrical inner or outer tanks 20, 21, relative to one another, each with an intermediate thermal insulation layer 22.

Tanks 20, 21 are made of plastic and each have a removable cover element 23, 24. Inner tank 20 can be fixed within outer tank 21 by means of fixing pins 25, 26. Cover element 24 has two connecting pieces 27, 28 passed through openings 30, 31 in cover element 23; inner tank 20 can be connected to the engine-coolant circuit via said pieces. Connecting pieces 27, 28 can be closed and opened by means of valves (not shown). Cooling water 29 is stored heat-insulated within tank 20; when required, e.g., when the engine is started, it can be conveyed back into the engine-cooling fluid circuit by means of a mechanism that is not shown, particularly a pump. For example, thermal insulation layer 22 can have Styropor.

A selective increase in heat capacity can be achieved by the specific design of the wall of tank 20, said wall which comes into contact with the cooling fluid. This can occur by the selection of the material, wall thickness, or by the provision of an additional component. Thus, the wall thickness can be optimized selectively in the selection of plastic as the wall material, so that an increased capacity results. The selection of the plastic can also provide advantages in terms of increasing the capacity.

Figure 3:
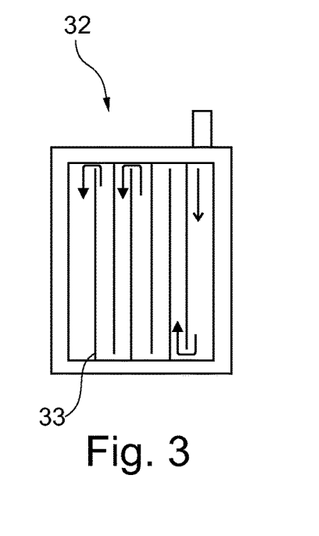
FIG. 3 is a schematic illustration of a third heat accumulator of the invention.
Figure 4:
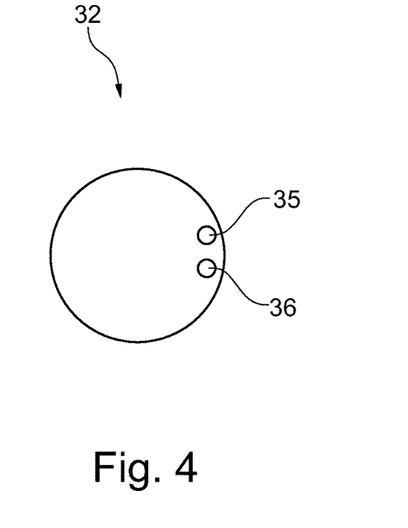
FIG. 4 is a heat accumulator according to FIG. 3 in a plan view.

FIG. 3 shows a heat accumulator 32 formed of plastic and having a plurality of inner and/or outer insulation panels 33 through which the medium that is to be kept warm can flow. FIG. 4 shows heat accumulator 32 in a plan view. The two connecting pieces 35 and 36 are visible via which heat accumulator 32 can be connected, for example, to an engine-cooling fluid circuit, as has been described under FIG. 2.

Figure 5:
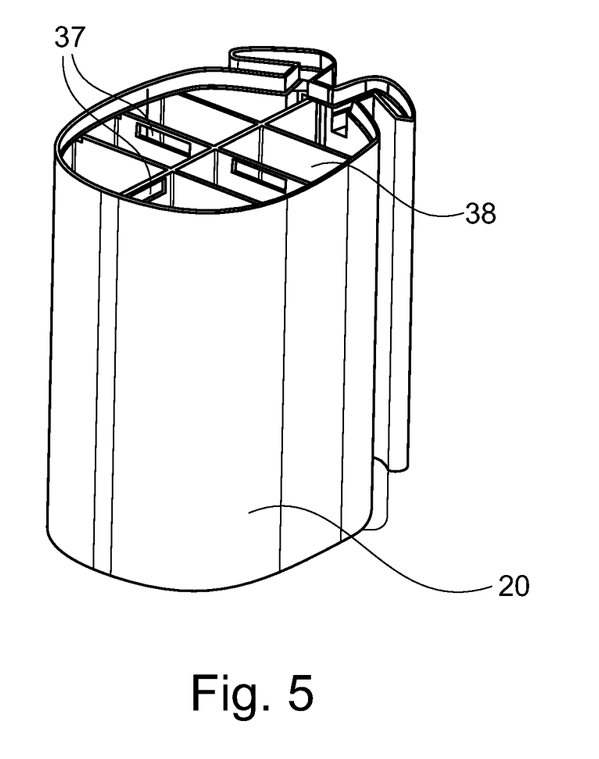
FIG. 5 is a schematic illustration of a further heat accumulator of the invention.
Figure 6:
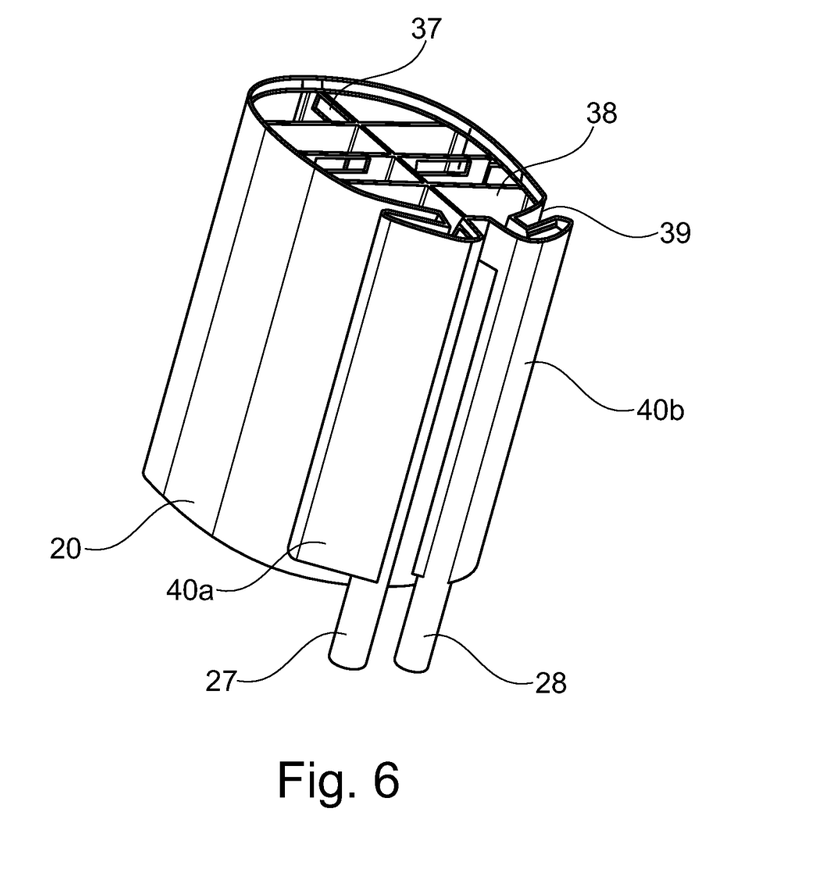
FIG. 6 is a schematic illustration of a further heat accumulator of the invention.

FIG. 5 and FIG. 6 show a further inventive heat accumulator according to the present invention, whereby in both figures only inner tank 20 is shown for the sake of clarity. In FIG. 5, in particular a plurality of openings 37 can be seen, through which the cooling fluid can flow serpentine-like through the individual chambers 38. Each of the total of eight chambers is thus connected fluidly through an opening with a neighboring chamber. Depending on the size of the individual openings, it is thus possible to influence the discharge behavior of the cooling fluid.

FIG. 6 shows the heat accumulator of the invention in a side view. Inlet connecting piece 27 or outlet connecting piece 28 can be recognized, which are disposed between inner tank 20 and the not shown outer tank. The inlet or outlet connecting pieces each open into an inlet channel 40a or outlet channel 40b, whereby the inlet or outlet channel is formed such that free spaces 39 arise between inner tank 20 and the two connecting pieces. Said free spaces 39 are provided for a not shown thermal insulation layer, so that it is possible to decouple inner tank 20 thermally from the connecting pieces. In addition, temperature stratification between the hot cooling fluid and the cold connecting pieces can be produced by thermosiphons. Thus, a thermal discharge can be prevented overall when the cooling fluid is stationary.

Figure 7:
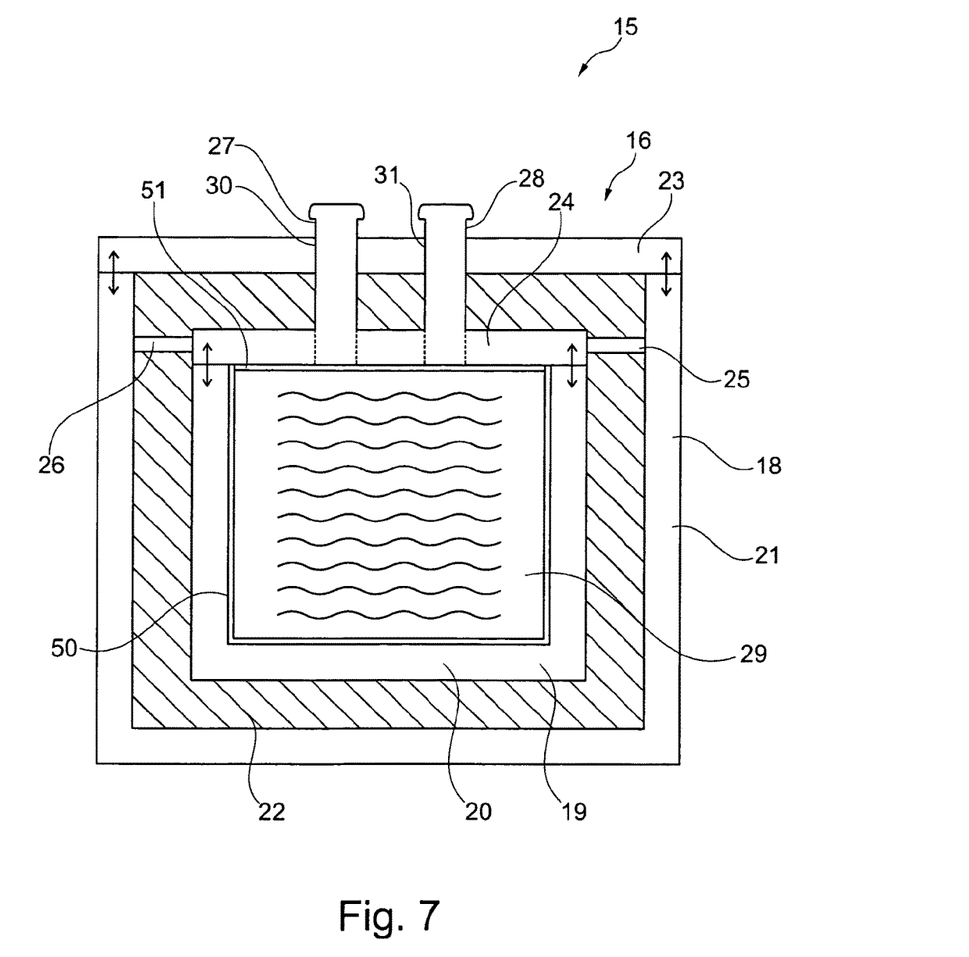
FIG. 7 is an exemplary embodiment with an element with increased heat capacity.

FIG. 7 shows a heat accumulator 15 for use in a motor vehicle, with a heat storage tank 16, which can be integrated into the engine-cooling fluid circuit, whereby as heat storage tank 16 an additional tank is provided, which with heat-insulating tank walls 18, 19 has cylindrical inner or outer tanks 20, 21, relative to one another, each with an intermediate thermal insulation layer 22. The heat accumulator can correspond substantially to the one in FIG. 2, whereby the wall of the inner tank is formed as a double layer. The tank is provided with wall coating 50, whereby the cover is provided with a coating 51. A selective increase in heat capacity can be achieved by the specific design of the wall of tank 20, said wall which comes into contact with the cooling fluid. This can occur by the selection of the material, wall thickness, or by the provision of an additional component. Thus, the wall thickness can be optimized selectively in the selection of plastic as the wall material, resulting in an increased capacity. The selection of the plastic can also provide advantages in terms of increasing the capacity.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat accumulator for use in a motor vehicle, the heat accumulator comprising:
   a heat storage tank integrated into a motor oil circuit, through which the motor oil flows when an engine is running, and which is decoupled from the motor oil circuit when the engine is turned off, wherein an oil pan of the engine is provided as the heat storage tank and is provided with heat-insulating tank walls; and
   a metal element for increasing a heat capacity of the heat accumulator,
   wherein the metal element is a wall coating provided on interior walls of the heat storage tank, such that the wall coating contacts motor oil present inside of the heat storage tank,
   wherein the heat storage tank includes an outer tank and an inner tank provided inside the outer tank, each of the outer tank and the inner tank being formed of the heat-insulating tank walls that are made of plastic,
   wherein an intermediate thermal insulation layer is provided between the inner tank and the outer tank, such that the intermediate thermal insulation layer surrounds all sides of the inner tank, and
   wherein the intermediate thermal insulation layer directly contacts an inner wall surface of the outer tank.

2. The heat accumulator according to claim 1, further comprising an oil-filled gearbox or an automatic gearbox, and wherein the oil-filled gearbox or the automatic gearbox is co-utilized as a heat storage tank.

3. The heat accumulator according to claim 1, wherein the oil pan is arranged in a lower section of the engine.

4. A heat accumulator for use in a motor vehicle, the heat accumulator comprising:
   a heat storage tank integrated into a motor oil circuit, through which the motor oil flows when an engine is running, and which is decoupled from the motor oil circuit when the engine is turned off, wherein the heat storage tank is formed as a separate heat-insulated tank, the heat storage tank being arranged in an area of an oil pan and is connected to the oil pan to enable inflow of oil from the oil pan into the heat storage tank or from the heat storage tank into the oil pan; and an element for increasing a heat capacity of the heat accumulator, wherein the element is integral with the heat storage tank and is a metal element, wherein the heat storage tank includes an outer tank and an inner tank provided inside the outer tank, each of the outer tank and the inner tank being formed of the heat-insulating tank walls that are made of plastic, wherein an intermediate thermal insulation layer is provided between the inner tank and the outer tank, such that the intermediate thermal insulation layer surrounds all sides of the inner tank, wherein the intermediate thermal insulation layer directly contacts an inner wall surface of the outer tank, and wherein the metal element is provided on inner walls of the inner tank so as to contact the motor oil present inside of the inner tank.

5. A heat accumulator for use in a motor vehicle, comprising:

a heat storage tank integrated into an engine-cooling fluid circuit, through which a heat storage medium flow occurs when an engine is running, and which is decoupled from the engine-cooling circuit when the engine is turned off, wherein the heat storage tank is provided with an inlet opening and an outlet opening and with heat-insulating tank walls; and a metal element for increasing a heat capacity of the heat accumulator, wherein the heat storage tank includes an outer tank and an inner tank provided inside the outer tank, each of the outer tank and the inner tank being formed of the heat-insulating tank walls that are made of plastic and the metal element being provided on inner walls of the inner tank so as to contact the heat storage medium present inside of the inner tank, wherein an intermediate thermal insulation layer is provided between the inner tank and the outer tank, such that the intermediate thermal insulation layer surrounds all sides of the inner tank, and wherein the intermediate thermal insulation layer directly contacts an inner wall surface of the outer tank.

6. The heat accumulator according to claim 5, wherein the heat storage medium flows through the inner tank when the engine is running and when the engine is turned off the inner tank is configured to be decoupled in terms of a thermally insulated, storable heat reservoir.

7. The heat accumulator according to claim 5, wherein the intermediate thermal insulation layer is an evacuated heat-insulating body.

8. The heat accumulator according to claim 7, wherein the evacuated heat-insulating body comprises compressed silica powder.

9. The heat accumulator according to claim 5, wherein the intermediate thermal insulation layer is a plastic insulation layer.

10. The heat accumulator according to claim 5, wherein the intermediate thermal insulation layer is an air insulation layer.

11. The heat accumulator according to claim 5, wherein the inlet opening is formed as an inlet connecting piece and the outlet opening as an outlet connecting piece.

12. The heat accumulator according to claim 11, wherein the inlet connecting piece and/or the outlet connecting piece are arranged at least partially between the inner tank and outer tank.

13. The heat accumulator according to claim 5, wherein the heat accumulator comprises a plurality of chambers, at least two of the plurality of chambers are connected such that they communicate with each other via at least one opening.

14. The heat storage element according to claim 5, wherein the metal element strengthens the wall of the inner tank at least in sections or overall.

15. The heat accumulator according to claim 5, wherein the inner tank contains water.

* * * * *